Aug. 8, 1950     R. C. DOBBS     2,518,127
BOOKSHELF FOR AUTO STEERING WHEELS
Filed Oct. 15, 1947
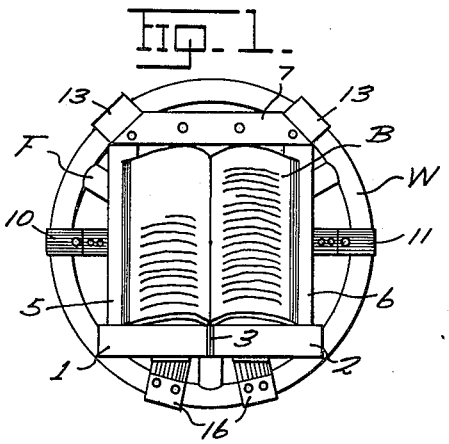
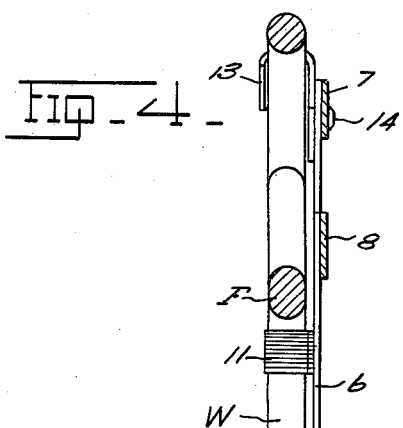
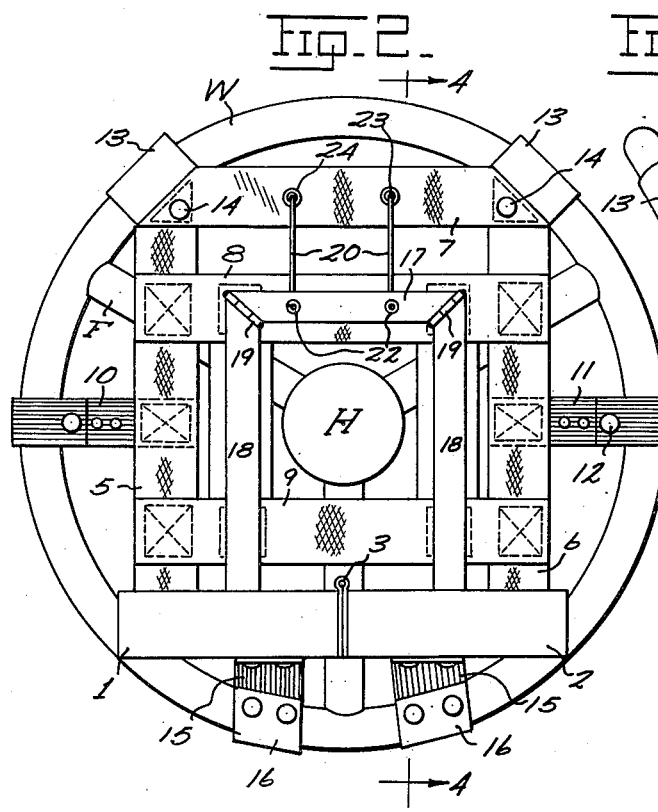
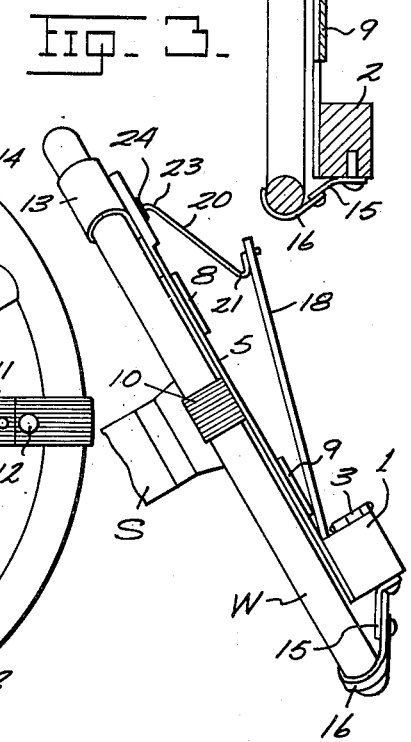
INVENTOR.
Robert C. Dobbs,
BY *Victor J. Evans & Co.*
ATTORNEYS Patented Aug. 8, 1950

2,518,127

UNITED STATES PATENT OFFICE 2,518,127

BOOKSHELF FOR AUTO STEERING WHEELS

Robert C. Dobbs, New York, N. Y.

Application October 15, 1947, Serial No. 780,015

1 Claim. (Cl. 45—58)

My present invention relates to the general class of furniture, and more specifically to a bookshelf for an automobile steering wheel and, while the shelf, book-holder, or reading stand is well adapted for other various purposes and uses, it is primarily designed as a specially supported attachment that is equipped with quick detachable fastening means for securely mounting the device or appliance upon a steering wheel.

The primary object of the invention is the provision of an attachment of this character by means of which a book or papers may be displayed in position for leisure reading and inspection; or a map may be held in position for ready glancing reference by the driver of an automotive vehicle for guidance without the hazards of inattention to the road.

To this end the invention consists in the combination and arrangement of a minimum number of parts that may with facility be manufactured at low cost of production, and the parts may be assembled with convenience to constitute a portable book holder that is collapsible or foldable for shipping and storing purposes, which may easily be manipulated, extended, and attached to a steering wheel when required for use; and which may with equal facility be quickly detached and removed from the wheel when not required for use.

The invention consists in certain novel features of construction and combinations and arrangements of these parts as will hereinafter be described in detail, and more particularly set forth in the appended claim.

In the accompanying drawings I have illustrated a complete example of a physical embodiment of my invention in which the parts are combined and arranged in accord with one mode I have devised for the practical application of the principles of my invention. It will however be understood that various changes and alterations are contemplated and may be made in these exemplifying drawings and structures, within the scope of my claim, without departing from the principles of the invention.

Figure 1 is a plan view of a steering wheel equipped with the book holder of my invention, and displaying an open book; and Figure 2 is an enlarged plan view of the steering wheel equipped with the attachment of my invention.

Figure 3 is a side view, as seen from the left in Fig. 2; and

Figure 4 is a transverse sectional view as at line 4—4 of Fig. 2.

In order that the general arrangement and utility of parts may readily be understood I have illustrated a portion of a steering wheel column S, with the wheel W mounted thereon and provided with a typical frame F made up of spokes or uniting bars, and an open book B is supported in position free of the horn button H located as usual at the center of the wheel and the top of the column.

In carrying out my invention I utilize a sectional hinged and foldable member of wood, plastic, or other similar desirable material that forms a base for the collapsible or folding parts of the equipment, as well as a shelf for supporting the book in proper position.

This foldable base or shelf is made up of two complementary sections 1 and 2 that are centrally hinged together at 3, and the shelf is shown as mounted on and extending horizontally and tangentially of the wheel W.

The shelf, in extended position, is supported on the wheel by means of an open-center flexible frame of generally rectangular shape that includes two parallel side straps or strips 5 and 6 fastened at their lower ends to the two sections 1 and 2 of the rigid shelf; and the upper ends of these side straps are united by a head-strap 7 to complete the rectangular frame.

A pair of laterally extending straps 8 and 9 have their opposite ends attached, as by stitching or in other suitable means, to the parallel side straps 5 and 6, and these straps 8 and 9 are spaced apart to accommodate the horn button H, as best seen in Fig. 2.

This flexible suspending or supporting frame, made up of fabric material or other desirable material is provided with a pair of lateral attaching straps 10 and 11 that are provided with quick detachable fasteners or snap buttons 12 so that the free ends of the straps may be folded around the rim of the wheel and fastened in adjusted position on the rim.

The flexible supporting frame is also provided at two of its corners with radially extending hooks 13 of resilient material, which are secured, as by rivets 14 to the two corners of the flexible frame, so that the hooks may be snapped or sprung on and off the rim of the wheel.

The foldable shelf or base is retained in position by two lower straps 15, 15, of elastic material that are attached to the respective sections 1 and 2 and each provided with a metallic hook 16 that fits snugly under the wheel rim.

In mounting the device upon the wheel the hooks 13 and the lateral straps 10, 11, are first attached to the wheel rim, and then the hooks 16, with their elastic connections or straps 15, are attached to the rim, thereby drawing the flexible suspending or supporting frame taut, and supporting it in stabilized position.

In order to adapt the device to the varying angularity of the plane of the steering wheel, an adjustable, generally U-shaped book-holder is mounted on the flexible frame in connection with the shelf or base member 1—2 so that the device may be adjusted for use with differently arranged wheels.

This U-shaped holder includes a rigid cross bar 17 having two parallel legs 18, 18, hinged at 19 to its opposite ends and the lower ends of the legs fit against the shelf members 1, 2. The holder may be adjusted with the lower ends of the legs acting as pivots to raise or lower the cross bar, and in adjusted position the holder is retained by the use of a pair of arms 20, 20, each having a supporting hook 21 that is slipped through a hole or socket 22 in the cross bar, and each arm has a suspending hook 23 that is slipped through an eyelet 24 of the head strap 7.

As thus described, it will be apparent that, when desired, the device may readily be detached from the wheel by first releasing the hooks 16 as the elastic straps 15 are stretched, and then the flexible frame, with the book holder, may be removed by releasing the snap fasteners 12, 12, and slipping the hooks 13, 13, off the wheel.

The detached appliance may then be compactly folded and packed into small size, and stored away as an accessory that is ready for use when needed.

Having thus fully described my invention, what I claim as new and desire to secure by Letters Patent is:

In a detachable support for an automobile steering wheel comprising a head strap, a pair of substantially parallel side straps attached perpendicularly to said head strap, a shelf member secured to said side straps, a plurality of fastening means extending from said head strap, side straps and shelf, respectively, each said fastening means being adapted to engage the rim of the steering wheel, a substantially U-shaped supporting element having the legs thereof pivotally resting upon said shelf, and arm means engaging said head strap and said supporting element for maintaining the same in a plane tilted relative to the plane containing said straps.

ROBERT C. DOBBS.

REFERENCES CITED

The following references are of record in the file of this patent:

UNITED STATES PATENTS

| Number | Name | Date |
| --- | --- | --- |
| 770,973 | Lippert | Sept. 27, 1904 |
| 1,667,171 | Sholin | Apr. 24, 1928 |
| 1,900,325 | Bayman et al. | Mar. 7, 1933 |
| 1,991,029 | Pinney | Feb. 12, 1935 |
| 2,228,806 | Anderson | Jan. 14, 1941 |